United States Patent [19]
Gustafson et al.

[11] 3,965,364
[45] June 22, 1976

[54] WAVE GENERATOR

[76] Inventors: Manfred Wallace Gustafson, Gamla Fagerstavagen 4; Kaj-Ragnar Loqvist, Regnbagsvagen 40, both of 773 00 Fagersta, Sweden

[22] Filed: June 10, 1974

[21] Appl. No.: 478,145

[30] Foreign Application Priority Data
June 18, 1973 Sweden .............................. 7308523

[52] U.S. Cl. .................................. 290/53; 415/7; 417/331
[51] Int. Cl.² ........................................ F03B 13/10
[58] Field of Search ................. 290/52, 53, 54, 42, 290/43; 415/7; 417/331, 332, 333

[56] References Cited
UNITED STATES PATENTS

| | | | |
|---|---|---|---|
| 1,898,973 | 2/1933 | Lansing............................ | 290/54 X |
| 3,064,137 | 11/1962 | Corbett et al..................... | 290/54 X |
| 3,126,830 | 3/1964 | Dilliner............................. | 417/331 |
| 3,362,336 | 1/1968 | Kadka................................ | 290/42 |
| 3,497,185 | 2/1970 | Dively............................... | 415/7 |
| 3,640,514 | 2/1972 | Albritton.......................... | 415/7 |

Primary Examiner—Herman J. Hohauser
Attorney, Agent, or Firm—Larson, Taylor and Hinds

[57] ABSTRACT

A device for utilizing energy stored in wave motion. A buoyant body on the water surface is anchored so as to permit free, unrestricted vertical movement when acted upon by a heaving wave. An energy collecting member connected to the buoyant body and including propeller blades is located at a depth where the water is not subjected to the vertical wave motion.

7 Claims, 2 Drawing Figures

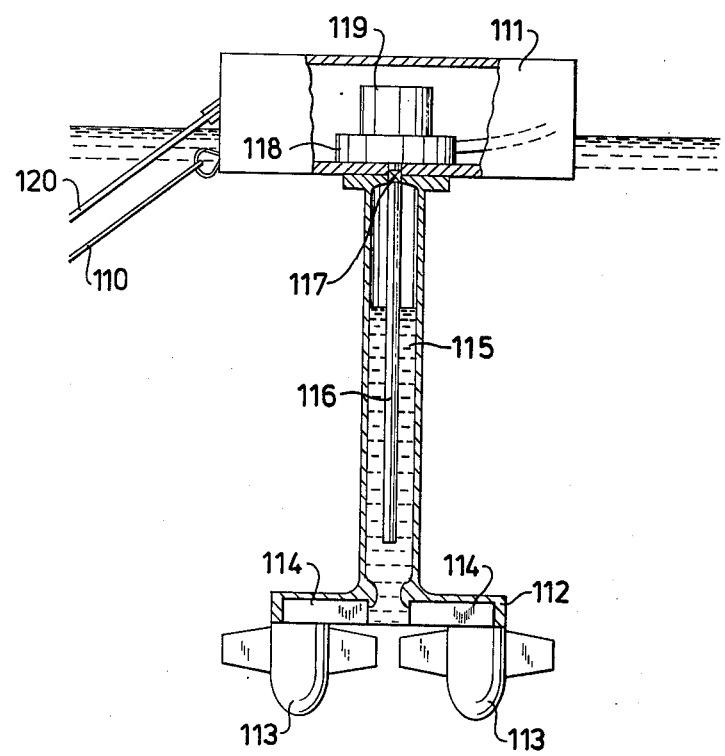

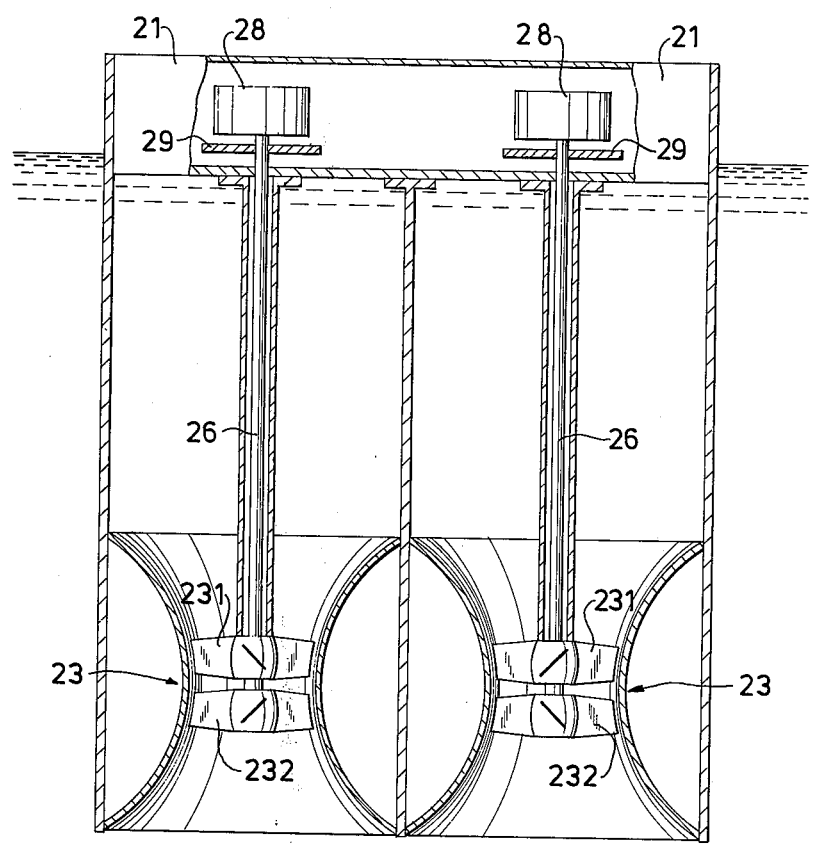

WAVE GENERATOR

The present invention refers to a device for the utilization of energy stored in the wave-motion or heaving of water.

In later years the scarcity of energy resources has become an increasingly greater problem to the industrialized countries all over the world. Normal water power is already utilized to a great extent and further expansion would result in heavily increasing costs and would at the same time necessitate increased violation of nature. In this situation the increasing energy demands must be satisfied by fossil or nuclear fuels. Both these energy sources, however, involve several environmental pollution problems and furthermore, the fossil fuel reserves are limited. Other possibilities of extracting energy from nature are therefore desperately wished for to-day. The utilization of solar energy as well as wind power have become technical topics in later years but, so far, the immense energy, stored in the heaving waves of the world's oceans, has not been subject to exploitation.

The mechanism of wave motion is thoroughly discussed and documented in science. The waves have properties that seem well suited for practical utilization of the energy tied therein. Thus it is well known that the water particles under the influence of wind pressure and gravity are set into a system of what is called orbital motion. The complexity of moving water particles is concentrated to the surface layers of the sea and at a depth of only one wave-length the amplitude is not more than 0.2% of the wave surface amplitude. This means that there exists close at hand two different states in the water; at the surface there may be forceful motion while at a relatively little depth, the water is at rest. The present invention is based on this phenomenon.

The invention is characterized by the following features.

At least one buoyant body (hereinafter referred to as "the float") floating on the water surface and moving vertically with the waves is connected to at least one restraining energy recipient, being equipped with one or more propellers or turbines located fully or partly at a depth where the surface waves do not act, or act to an insignificant degree upon the surrounding water volume.

In the following specification the invention is described in detail with reference to the accompanying drawings, which examplify some embodiments of the invention.

In FIG. 1, there is shown an axial section of an embodiment in which the float is rigidly connected to the energy recipient.

FIG. 2 shows a similar arrangement with an energy recipient of a somewhat modified design.

The distance H between the float 111 and the restraining recipient 112 of FIG. 1 is chosen such that the latter is at a depth where the water is at rest when the surface is heaving. The reciprocating vertical motion, generated by the waves, forces the propellers 113 to rotate as they are being moved through the tranquil water layers. By the use of two or any other even number of propellers, which are rotating in opposite directions, it is precluded that the entire device is set into rotation, which would happen if one single propeller would be used. The propellers 113 drive one common or two separate pumps 114, which pump water into a pressure vessel 115 that is partly filled with air. This vessel is connected to a water turbine 118 via a tube 116 and a delivery valve 117. The valve opens at a specific pressure, which means that the turbine will be driven by water of fairly constant pressure. When the waves are not big enough for generating this critical pressure, the water is stored in the vessel 115. The turbine 118 is coupled to a generator 119 producing electric energy. The device is kept in position by means of the anchoring wire 110. This may also serve as a convenient support for the electric cable 120 from the generator 119.

The device shown in FIG. 2 is similar to the one in FIG. 1, but here the propellers have been replaced by two or any other even number of turbines 23, rotating in opposite directions. The turbines are each equipped with double blade-wheels 231 and 232. The blade-wheel 231 exerts a torque to the shaft 26 in the upward motion of the device while it is free-running in the downward motion. The blade-wheel 232 works the opposite way. Thus either of the two is engaged in the rotation of the shaft 26 at any arbitrary moment. Via the shaft 26 an energy converting aggregate 28 is driven, which can be conveniently located within the float 21. The energy converting unit 28 may be either a pump aggregate, an electric generator or may be an entire system like 114, 115, 116, 117, 118, and 119 of the device shown in FIG. 1. A fly-wheel 29 may be incorporated to serve as a balancing mass.

The device, designed as examplified in FIGS. 1 or 2 may also be so modified as to utilize the rotation of propellers or water turbines for the direct driving of electric generators without intermediate arrangements. An alternative arrangement in the FIG. 2 version would be to lead the water stream in the manner often common in Francia-turbines but then leading the water stream in the same direction by means of flaps irrespective of the direction of the float's motion.

In all units described above, but especially in those cases when the generators run at varying speeds or changing directions of rotation, the generated current can be rectified by means of electric valves and fed to an alternating current line via inverters.

One application area of electricity producing systems of the type described above would be the one in which the electric energy is utilized for the extraction of hydrogen from sea water. Preferably the production unit would then be located in the Atlantic or any other wide ocean. Instead of anchoring, the position could be controlled by means of driven propellers.

We claim:

1. A device for the utilization of energy stored in the wave-motion or heaving of water, comprising at least one buoyant body located at the water surface, wherein said buoyant body is anchored in a way which permits substantially unrestricted movement thereof in an essentially vertical direction independently of the wave height and water depth when acted upon by the heaving waves, at least one lower member connected to the buoyant body, said lower member comprising at least two oppositely rotating propellers on different vertical shafts, said propellers positioned at a distance below the buoyant body which locates them fully or partially at a depth where the surrounding water has substantially no vertical motion and including an energy collecting means for receiving and collecting the energy created by rotation of the propellers.

2. A device according to claim 1, wherein said energy collecting means is an electric generator.

3. A device according to claim 2, each shaft being connected to the shaft of a separate electric generator.

4. A device according to claim 1, including a pump means for receiving the water delivered via said propellers and for delivering the water to the said energy collecting means to operate the same.

5. A device according to claim 1, including a separate pump means for receiving water from each propeller, and including a vessel position to receive both air and Water from the pump means, and means for delivering water from said vessel to said energy collecting means to operate the same.

6. A device according to claim 1, including a pair of oppositely rotating propellers on each of said shafts.

7. A device according to claim 6, said shafts being connected directly to the said energy collecting means to operate the same.

* * * * *